United States Patent [19]

Rossmann et al.

[11] 4,415,250
[45] Nov. 15, 1983

[54] FOCUSING SYSTEM FOR LONG FOCAL LENGTH OBJECTIVES

[75] Inventors: Dieter Rossmann, Aalen; Volker Donn, Königsbronn; Christian Ludwig, Oberkochen, all of Fed. Rep. of Germany

[73] Assignee: Carl-Zeiss-Stiftung, Heidenheim/Brenz, Fed. Rep. of Germany

[21] Appl. No.: 385,240

[22] Filed: Jun. 4, 1982

[30] Foreign Application Priority Data

Jun. 11, 1981 [DE] Fed. Rep. of Germany ....... 3123084

[51] Int. Cl.$^3$ .............................................. G03B 3/00
[52] U.S. Cl. ..................................... 354/195; 354/82; 350/255
[58] Field of Search ................... 354/82, 195; 352/95; 350/255

[56] References Cited

U.S. PATENT DOCUMENTS 2,984,167 5/1961 Staubach ............................. 350/255
3,827,061 7/1974 Kellner ................................ 354/195

Primary Examiner—John Gonzales
Attorney, Agent, or Firm—Stonebraker, Shepard & Stephens

[57] ABSTRACT

A focusing system for long focal length objectives, having an intermediate tube between the camera and the objective proper. For purposes of focusing, there is a displaceable part movable longitudinally through the intermediate tube, and movement of this part serves to move the lens elements axially for focusing. A receiver portion on the bottom of the intermediate tube receives interchangeably, in quickly attachable and detachable manner, either one of two different focusing mechanisms, the first having the shape of a gun stock with a trigger-like member serving to focus the lens quickly but not necessarily precisely when quick picture shooting of moving objects is desired, the second mechanism having means for accurate focusing and a tripod thread socket. Provision is made for turning the camera 90 degrees to change the format of the picture. Mechanism is provided for pre-setting the diaphragm aperture, and for operating the diaphragm of the lens at the front end of the intermediate tube from the camera located at the rear end of the tube, with provision for adjusting these mechanisms properly when the camera is turned to change the format, without turning the objective at the front of the tube. It is not necessary to detach either the camera or the lens when changing from one focusing mechanism to the other, or when turning the camera to change the format.

13 Claims, 4 Drawing Figures

FOCUSING SYSTEM FOR LONG FOCAL LENGTH OBJECTIVES

BACKGROUND OF THE INVENTION

The invention relates to photographic lenses or objectives of long focal length, and particularly to a system for focusing such lenses.

In order to be able to use long focal length lenses conveniently and reliably, it is known in the art to connect the lens proper or lens mounting parts to the camera by means of an intermediate supporting tube, and to provide the tube with a convenient hand hold or manual gripping part and with a shoulder rest similar to a rifle stock. The manual grip is sometimes developed in two parts arranged so that the pressing of the two parts together by the hand which embraces them effects the focusing motion of a displaceable member in the intermediate tube, the motion of this member serving to carry out the focusing of the lens. Such focusing systems are disclosed, for instance, in West German published patent applications (Offenlegungsschriften) Nos. OS 22 36 344 and OS 22 29 444.

So-called rapid shooting objectives provided with such grips can be used advantageously to photograph moving objects. However, they do not permit precise focusing, and therefore are not suitable for many uses in which an exact focus is necessary, for instance, in order to obtain the highest possible resolution. For such uses, the intermediate tube with the focus setting grip can be replaced with some other mechanism, e.g., a bellows unit, but in order to make the replacement it is necessary to detach the camera and the lens from each other, which is not only inconvenient but also increases the danger of dirt reaching the optical parts of the camera or lens or both.

SUMMARY OF THE INVENTION

An object of the invention is to provide a focusing system of the kind in which a long focal length objective is connected to the camera by an intermediate supporting tube containing a displaceable part for focusing the lens, with a rapid setting grip and, for alternative use, a fine focusing mechanism, so designed that they may be interchangeably applied to the intermediate tube without any great difficulty.

A further and more specific object is to provide a long focal length objective or lens connected to the camera through an intermediate connecting tube in which a part is movable for focusing the lens, in combination with a first housing having a rapid focusing grip and a second housing having a fine or accurate focusing adjustment, the parts being so designed and constructed that the two housings may be interchangeably and selectively attached to the intermediate supporting tube of the lens in a convenient, easy, and comparatively quick manner, without detaching the intermediate lens tube from the camera.

These objects are achieved by providing a first housing having a lever which may be actuated by a finger of the hand which grips this housing, the lever having a part extending from the housing into the tube to actuate the movable focusing member therein, and by providing a second housing having a manually operable fine adjustment member which operates a lever extending into the tube in a manner similar to the lever of the first housing, and by providing a simple latch arrangement for latching either one of the two housings, as desired, in operative position on a receiver attached to the intermediate tube.

It is particularly advantageous if the manually actuated lever of the rapid setting grip (the "first housing" above mentioned) produces a reversal of the direction of movement, i.e., a rearward pull on the manually accessible part of the lever produces a forward movement of the focus setting member within the tube, thereby focusing the lens upon a closer object. In this way, objects which are coming toward the user can be held in focus by tightening the grasp of the actuating hand, which enhances the usefulness of the device under these circumstances.

In order to keep the force required for the focusing constant even when the position of use of the rapid setting lens is at a substantial angle to the horizontal, the part of the intermediate tube which is movable for the distance setting or focusing is pre-tensioned against the bearing part, by means of an adjustable spring force. In this way, the action of gravity on the easily moved lens head can be compensated. It is also advantageous to have automatic compensation of the gravity force, or at least automatic indication of the amount of compensation needed when shooting pictures at various angles of inclination to the horizontal. A position indicator may be used to produce a signal which corresponds to the inclination of the objective, this signal indicating the amount of gravity-compensation needed for that particular inclination.

Rapid focus lenses are frequently used for taking a series of pictures in which the focus distance needs to be varied only within a given region or certain limits which correspond to the displacement of the displaceable member of the intermediate tube between two fixed points. Operation is facilitated if stops are provided to fix these points. After release of the pressure of the user's hand, the point to be set can be found again faster and more reliably by utilizing the stops.

In order to be able to take photographs in either vertical or horizontal format with the same position of the lens, it is furthermore advisable to develop the bearing body of the intermediate tube as two parts which are turnable with respect to each other about the optical axis as a center of rotation. One of these parts is connected to the camera, and the other part is attached to the receiver for receiving the rapid setting grip member. The preferred construction also provides an actuating member to stop the rotation of the parts in two positions which are angularly spaced 90 degrees from each other.

If the intermediate tube also contains the pre-selection and setting mechanism for the diaphragm of the lens which is attached to the front end of the tube, a separation place for allowing the change in format must be provided for these diaphragm pre-selecting and setting parts. It is advantageous to develop this separation place in such manner that the parts which are turnable with respect to each other can be disengaged from each other to permit turning, only after a short axial movement.

BRIEF DESCRIPTION OF THE DRAWINGS

In the accompanying drawings, which show an illustrative embodiment of the invention.

DESCRIPTION OF THE PREFERRED EMBODIMENT

Figure 1:
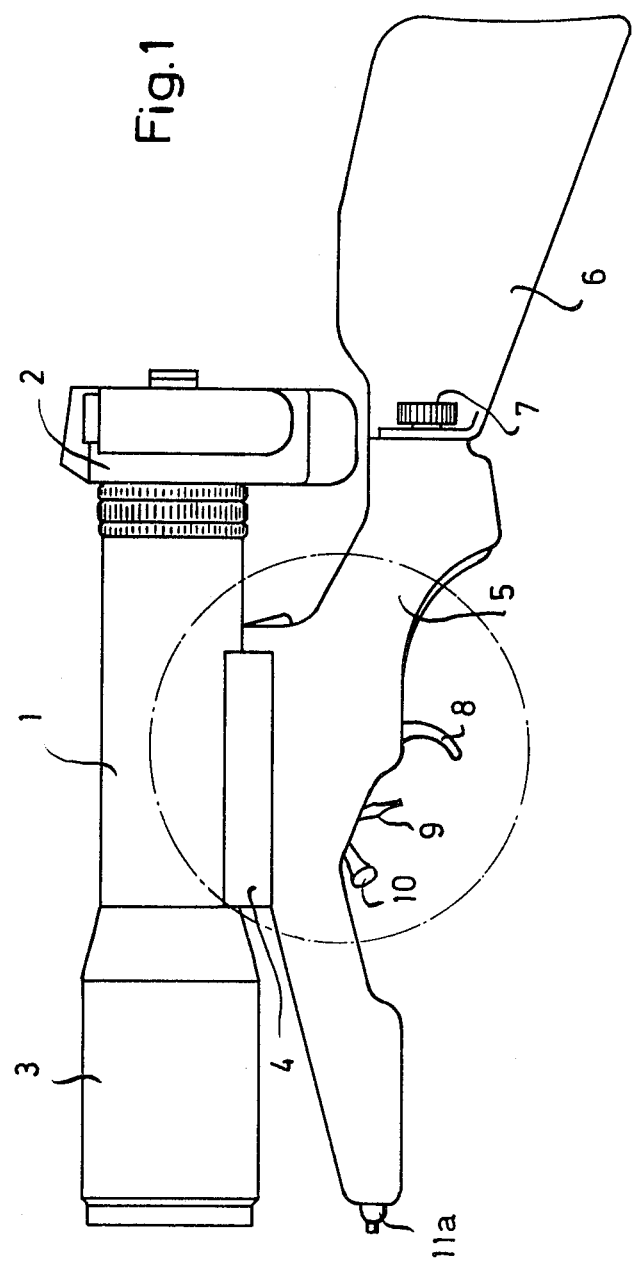
FIG. 1 is a somewhat schematic side elevational view of the complete focusing system including lens, camera, and intermediate tube with rapid setting grip attached.

As shown in FIG. 1, the intermediate tube 1 connects the long focal length lens or objective 3 with the camera 2, both the lens and the camera being of conventional known construction. Firmly attached to the tube 1 is a small hollow chamber 4 which may be called a receiver, since it receives and holds, interchangeably, either one of the two housings containing the two manually operable focusing arrangements, for fast and somewhat coarse focusing, and for slower and more precise focusing, respectively. FIG. 1 shows the rapid focusing or fast setting housing or grip 5 detachably connected to the receiver. This grip member is of a shape similar to a gun stock. The rear part of the grip is developed as a shoulder rest 6. It can be adjusted in height or entirely removed upon loosening a clamping screw which has a large and easily accessible knurled head 7.

The switch or plunger 11a arranged on the front end of the stock 5 serves to release the shutter (not shown) of the camera 2, to make an exposure. Any suitable conventional connections are provided from the member 11a to the shutter.

The rapid setting grip 5 contains a focus setting lever 8 (FIGS. 1 and 2) fastened on the shaft 11 and having a lower end projecting downwardly below the bottom of the grip member in a position similar to that of a trigger of a rifle or other firearm, and adapted to be operated by the index finger of the hand of a person grasping the grip member 5. Adjusting members 9 and 10 control the position of stops 19 and 20 which may be used to limit the extent of swinging of the focus setting lever 8.

Figure 2:
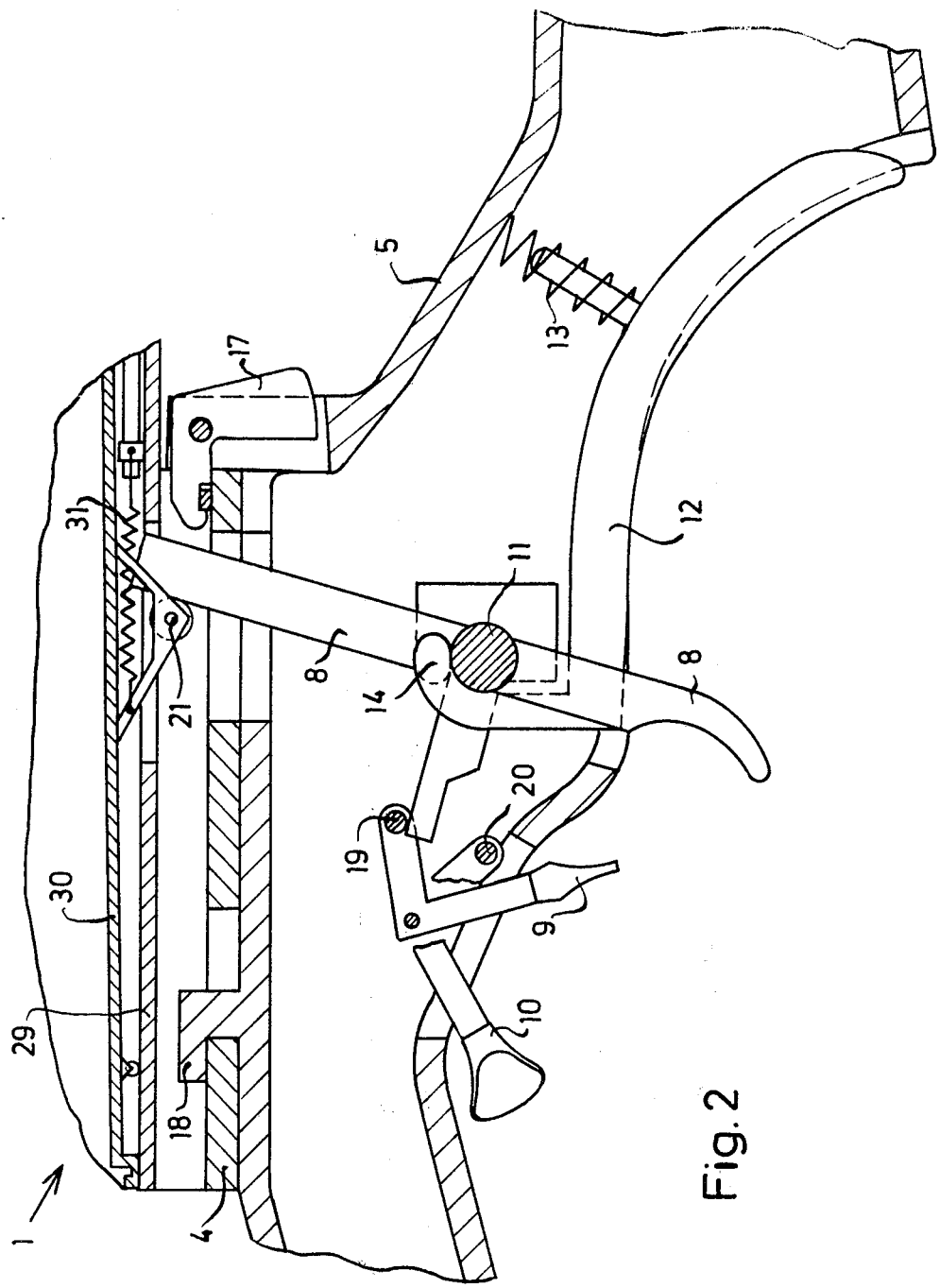
FIG. 2 is a fragmentary vertical section through the part of the construction enclosed within the dot-dash circle in FIG. 1, on a larger scale and with parts broken away.

The upper portion of the focusing lever 8, above the pivot 11, extends up through openings in the top of the stock member 5 and the bottom of the receiver member 4, into the intermediate tube 1, and engages against a roller 21 which is connected to the movable member 30 mounted for longitudinal movement within the tube 1. Movements of this member 30 serve to focus the lens elements (not shown) in a conventional known manner, for objects at different distances. As usual in most focusing lenses, a forward movement of the focus adjusting part 30 will focus the lens upon a closer object, and a rearward movement of the part 30 will focus the lens upon a more distant object. The range of movement of the focusing lever 8, and thus the range of displacement of the part 30, may be limited, if desired, by setting the limiting stops 19 and 20. Also, the focusing lever 8 may be clamped and held stationary in any desired position, by pressing upwardly on a clamping lever 12 which extends for a distance along the lower edge of the stock 5, as seen in FIG. 2. This clamping lever 12 swings on its pivot 14, and when it is pressed upwardly by the fingers of the hand not used for focusing, a portion of the lever 12 will press firmly against and prevent rotation of the shaft 11 to which the focusing lever 8 is fixed, thus preventing the focusing lever from turning. Upon release or relaxation of the upward manual pressure on the clamping lever 12, a spring 13 will press the lever downwardly and release the clamping effect on the shaft 11 and focusing lever 8, so that the focusing lever is again free to swing so far as permitted by the setting of the limiting stops 19 and 20, which cooperate with a stop arm which is part of the lever 8 or which is firmly fixed to the shaft 11, if not made as part of the lever 8.

For mounting the stock-like housing 5 on the receiver 4 in a quickly and easily attachable and detachable manner, the housing 5 is provided with a hook-like upward extension 18 (FIG. 2) which, when the parts are assembled, extends up through a slot in the bottom wall of the receiver 4 and then forwardly to overlie a portion of that bottom wall, as clearly illustrated. Further rearwardly, a latch member 17, pivotally mounted on the housing 5, extends over a portion of the bottom wall of the receiver 4, and is resiliently held in the illustrated latching position by a conventional spring, not shown. When the exposed tail of the latch 17 is pressed to swing the latch clockwise against the force of its spring, to release the latch, the housing 5 may then be slid rearwardly a short distance, whereupon the hook member 18 no longer overlies the wall of the receiver 4 and the housing 5 may be separated completely from the receiver 4 and its associated tube 1, the upper end of the focusing lever 8 simply pulling out of the opening in the receiver 4 and tube 1. The parts may be re-assembled quickly by a reverse procedure.

Figure 3:
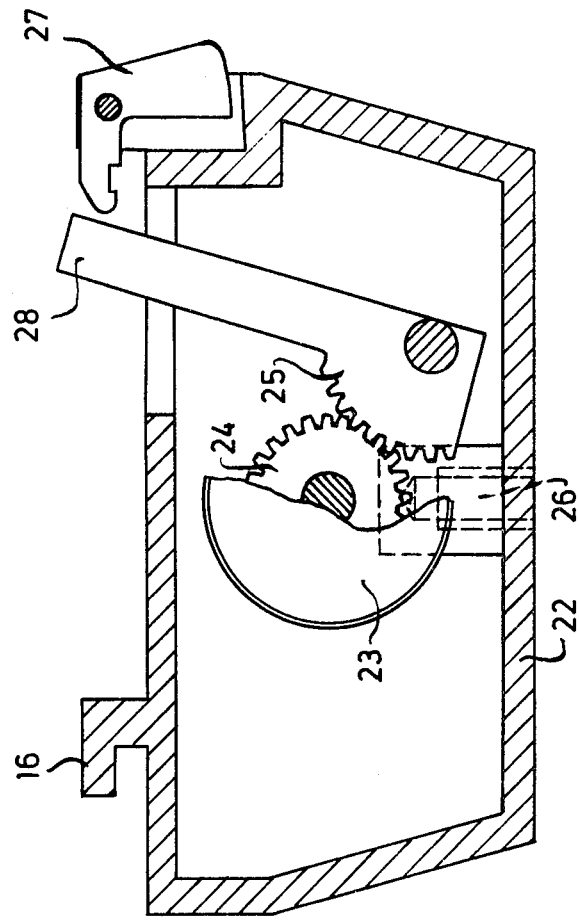
FIG. 3 is a vertical section through the second housing which contains the fine focusing mechanism.

The other or second housing, for containing the fine or precise focusing mechanism, is shown at 22 in FIG. 3. It has on its top wall a hook shaped member 16 corresponding to the hook shaped member 18 on the first housing 5, and near its rear end it has a pivoted latch 27 corresponding to the latch 17 of the first housing 5. This second housing 22 fits against the bottom of the receiver 4 and is held in place thereon in exactly the same way as the first housing 5, and it is seen that either housing may be quickly and easily taken off or put on the lens, lens tube, and camera asssembly without having to disassemble the camera from the intermediate tube. This is an important advantage. This housing 22 has a threaded socket 26 for receiving a tripod mounting screw.

The fine focusing mechanism of this second housing comprises a focusing knob 23 mounted externally on a side wall of the housing 22, in position to be conveniently accessible for manual turning. This knob is connected to a gear 24 within the housing, which meshes with a gear segment 25 formed on a swinging arm 28 which corresponds in size and relative location to the upper part of the focusing lever 8 in the first housing 5. When this second housing 22 is properly mounted on the receiver 4 in place of the first or rapid-focus housing 5, this lever 28 will be in the same location as the upper portion of the lever 8 previously described, and will engage against the roller 21 of the focus mechanism of the tube 1, just as previously described. So when accurate focusing for maximum resolution is desired, the second housing 22 is applied to the lens tube 1 and the camera is focused by turning the knob 23, and when quick shots of moving objects are desired, and precise focusing is not required, the first or fast setting housing is applied, and fast focusing is obtained by finger pressure on the trigger-like lower end of the lever 8.

Figure 4:
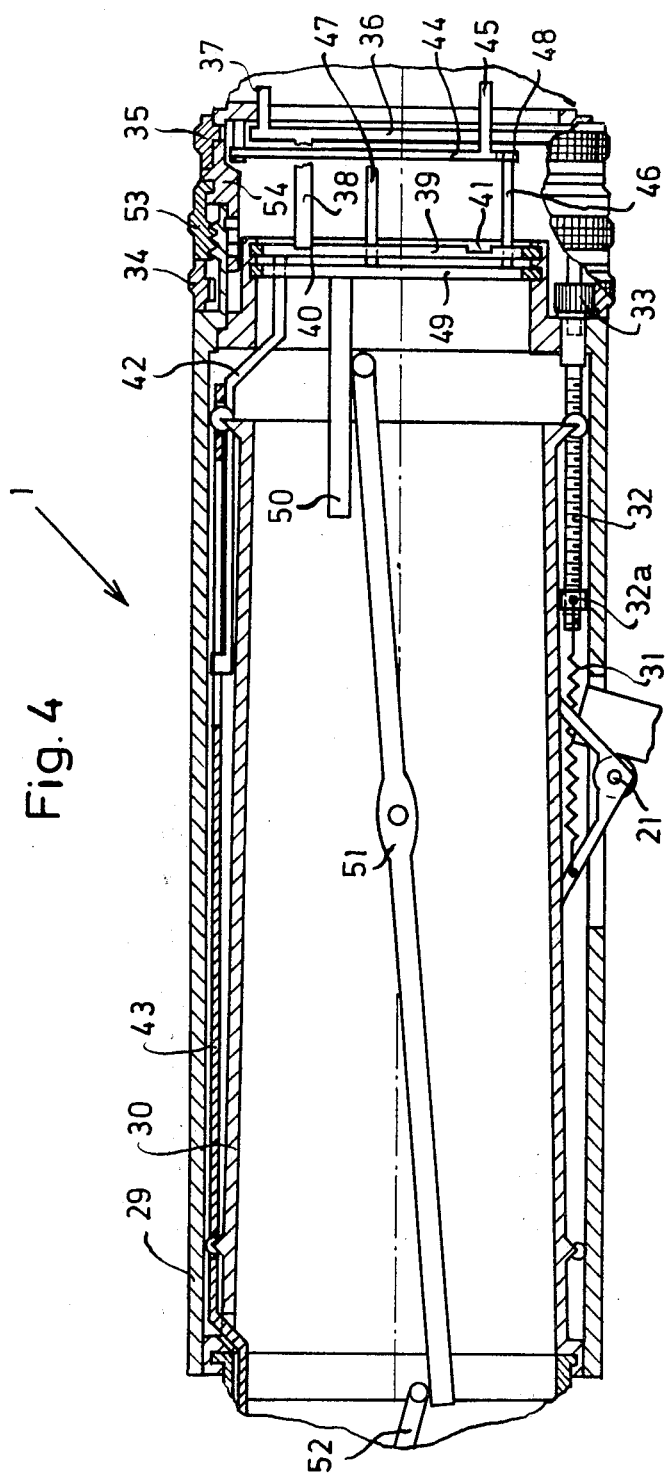
FIG. 4 is a longitudinal vertical section through the intermediate tube of FIG. 1.

For focusing, the part 30 is displaceable longitudinally in the bearing part 29 of the intermediate tube 1, by the forward pressure of the focusing lever 8 or 28, as the case may be, and the rearward pull of the spring 31, which keeps the roller 21 against the front edge of the focusing lever. The spring force is adjustable by turning the setting ring 34 (FIG. 4) which has internal teeth meshing with a pinion 33 fixed to a long screw 32 on which rides a nut 32a to which the rear end of the spring 31 is attached, while the front end of the spring is attached to the part 30.

The camera 2 is attached by any conventional attaching means (e.g., the well known bayonet connection lugs, not shown) to a rear part 54 (FIG. 4) of the intermediate tube 1. This rear part 54 is rotatable about the optical axis with respect to the main bearing part 29 of the tube. This permits a swinging or turning of the camera with respect to the main portion of the intermediate tube, to produce a change of the picture format from, for instance, a vertical format to a horizontal format, or vice versa, without disturbing the way that the objective itself and the main portion of the intermediate tube are held by the first housing 5 or the second housing 22.

The rotatable part 54 and the main part 29 have mating projections and notches arranged to hold the rotatable part anchored in either one of its two format positions spaced 90 degrees from each other. To anchor the part 54 in the desired position, and to release it for rotation to the other position when desired, there is an actuating ring 53 which is screw threaded onto the rear end of the main part 29, and which has an internal flange engaging in an external circumferential groove in the member 54, all as clearly illustrated in FIG. 4. When the actuating ring 53 is screwed tightly onto the main part 29, it draws the rotatable ring 54 tightly against the rear end of the main part 29 so that the mating projections and notches of these parts are interengaged with each other and the ring is anchored against rotation. If it is desired to turn the camera to change to the other format, the actuating ring is unscrewed slightly to cause rearward movement of the rotatable member 54 (to which the camera is attached) far enough to unmesh the projections and notches from each other, whereupon the member 54 and the camera may be turned through 90 degrees to the other format position, and then the ring 53 is again tightened to anchor the parts in this position.

This construction serves well for use with "automatic" or spring-loaded diaphragms, as the above mentioned slight axial separation of the parts which enables the turning from one camera format to the other format will also enable the diaphragm control mechanism to be disconnected and properly reconnected in a new position when the camera format is changed.

A diaphragm pre-selection ring 35 (FIG. 4) is mounted for rotation of the tube part 54. This external ring 35 is connected to and drives an inner ring 36 which has a finger 37 extending rearwardly into the attached camera, for introducing the pre-selected diaphragm aperture value into the camera in known manner. On the ring 36 there is also a pin or finger 38 which extends forwardly and which may be engaged optionally into either one of two recesses or notches 40 and 41, arranged at an angular separation of 90 degrees from each other in a rotatable ring 39 parallel to and spaced forwardly from the ring 36, and rotating in a suitable bearing in the main tube part 29.

On this ring 39 there is a forwardly extending yoke 42 which engages in force-locked manner with a swinging member 43 which extends forwardly through the tube part 29 to the objective 3 (FIG. 1) at the front end of the tube, and serves to control the pre-selected aperture of the diaphragm in a manner which will be understood by those familiar with the art of automatic diaphragms. Through these connections, the preselected aperture is controlled from the manually settable ring 35.

The same axial separation of the member 54 from the member 29, which occurs when the ring 53 is partially unscrewed to permit the camera to be turned from one format to the other format, will also withdraw the pin 38 on the ring 36 from the recess 40 or 41 in which it was seated on the ring 39. Then when the turning to the other format is complete and the screw ring 53 is again tightened, the pin 38 will seat in the other one of the notches 40 and 41. The parts 29 and 54 have limiting stops or abutments to limit their rotation relative to each other to 90 degrees, and when the parts are turned as far as they will go from one limit to the other, the pin 38 formerly in one of the recesses 40, 41 will now be in the right position to enter the other recess, and the previously mentioned notches and recesses on the parts 29 and 54 will properly line up with and mate with each other.

The camera-connected part 54 of the intermediate tube 1 contains still another rotatable ring 44 which has a rearwardly extending control finger 45 which enters the attached camera and is controlled and moved by the diaphragm movement mechanism of the camera. For the purpose of transmitting this movement properly to the long focal length objective 3 at the front of the tube 1, there is a ring 49 rotatable in suitable bearings in the part 29 of the tube, and this ring has two rearwardly extending pins 46 and 47, angularly spaced 90 degrees from each other. A hole 48 in the ring 44 can receive, selectively, either one of these pins, to couple the two rings 44 and 49 to each other in either one of two positions 90 degrees from each other. The change from one position to the other can be made when the members 29 and 54 are slightly separated axially as above described. The ring 49 has a forwardly extending finger 50 which bears on the rear end of a long lever pivoted on the side wall of the focus adjusting member 30, the overlap of the lever and the finger 50 being great enough to assure contact throughout the entire range of travel of the member 30. The front end of the lever 51 engages a lever or actuating finger 52 in the objective 3, to transmit the diaphragm setting movement from the camera to the objective.

What is claimed is:

1. A focusing system for long focal length objectives of the type connected to a camera by an intermediate tube containing a displaceable part movable to effect focusing of the objective, said focusing system comprising the combination with said tube of a first housing and a second housing, and means for interchangeably mounting either of said housings on said tube, each housing containing a focusing arm which, when the housing is mounted on the tube, engages said displaceable part of the tube to effect focusing of the objective, said first housing being in the form of a rapid setting grip having a hand operated member positioned for actuation by a finger of a hand grasping the grip, said member operating the focusing arm of said first housing, said second housing having fine adjustment mechanism for operating the focusing arm of the second housing.

2. The invention defined in clam 1, further comprising releasable locking pawl means (17, 27) for holding each of the two housings in mounted position on said tube.

3. The invention defined in claim 1 wherein said hand operated member of said first housing and the focusing arm operated thereby move in opposite directions so that a rearward movement of said member will cause a forward movement of the focusing arm and the displaceable part moved in the tube by the focusing arm.

4. The invention defined in claim 1 wherein said rapid setting grip (5) further comprises a clamp (12, 14) actuatable against spring force (13) for clamping the focusing arm (8) of the grip.

5. The invention defined in claim 1 wherein said rapid setting grip (5) has at least one adjustable stop (19, 20) which limits the focusing path of the focusing arm (8).

6. The invention defined in claim 1 wherein said rapid setting grip (5) has a stock portion (6) which can be swung away or removed.

7. The invention defined in claim 6 wherein the stock part (6) which rests against the shoulder is vertically adjustable.

8. The invention defined in claim 1 wherein said second housing (22) which contains the fine adjustment mechanism (23-25) has a coupling (26) for attachment of a tripod.

9. The invention defined in claim 1 wherein a portion (30) of said intermediate tube (1) which is displaceable for focusing is prestressed by adjustable spring force (31) with respect to a tube portion (29) which supports it.

10. The invention defined in claim 1 wherein said intermediate tube has a diaphragm aperture pre-set ring (35) and transmission mechanism (36-43) operatively connected to said pre-set ring to introduce a set value into the camera (2) and the objective (3).

11. The invention defined in claim 10 wherein said intermediate tube also has mechanism (44-52) including a lever for transmitting a diaphragm setting motion from the camera (2) to a diaphragm part in the objective (3).

12. The invention defined in claim 11 wherein said intermediate tube (1) and said transmission mechanism (36-43) for the pre-set value and said mechanism (44-52) for transmitting the diaphragm setting motion each comprises separable parts turnable with respect to each other, further comprising an actuating member (53) for holding the separable parts selectively in either one of two positions of orientation spaced at an angle of 90 degrees from each other.

13. The invention defined in claim 11 wherein said intermediate tube (1) is in two parts axially movable relative to each other to a limited extent from a tight locked position to a separated position and rotatable relative to each other when in said separated position, further comprising an actuating member (53) for holding the two parts of the tube in tight locked relation to each other in either one of two positions of orientation angularly spaced 90 degrees from each other, said aperture pre-set transmission mechanism (36-43) and said diaphragm motion transmission mechanism (44-52) each having portions which are separable from each other upon axial movement of said tube parts to separated position and engageable in operative relation to each other when said tube parts are brought into tight locked position in either one of their two positions of orientation.

* * * * *